March 13, 1928.
J. R. WELCH
1,662,551
METALLIC VEHICLE WHEEL
Filed Dec. 14, 1923
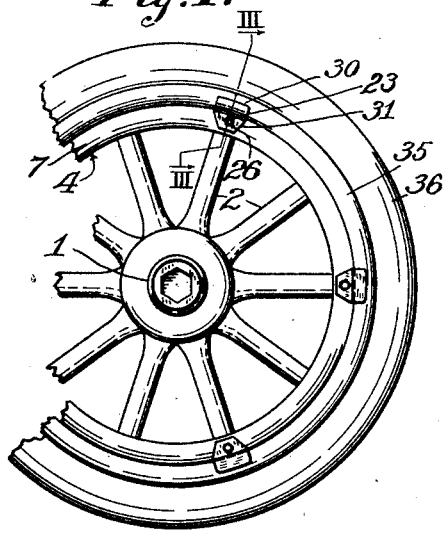
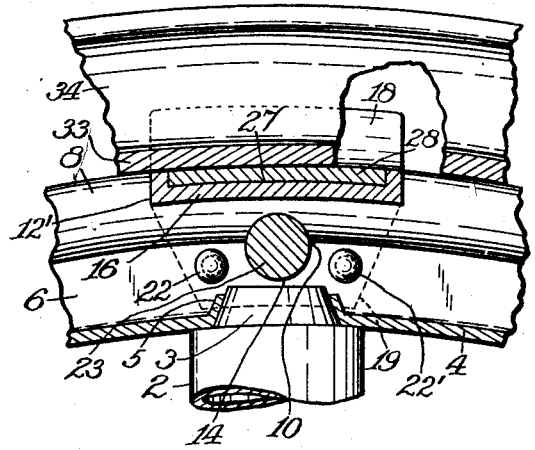
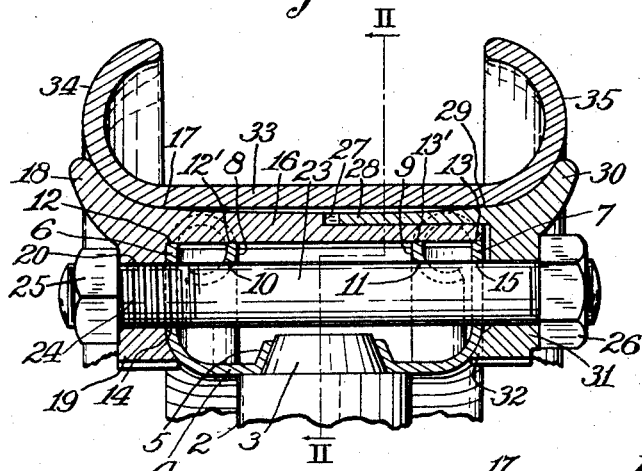
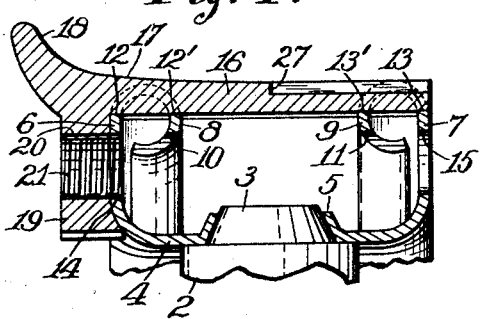
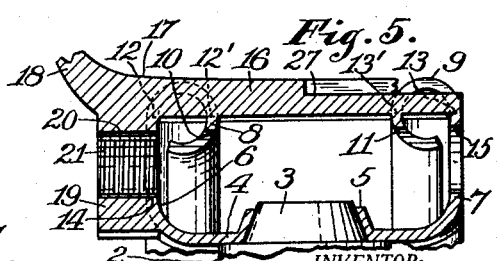
INVENTOR:
John R. Welch, deceased,
Viola M. Welch, Executrix
of the last will of the inventor,
By E. I. Silvius,
ATTORNEY.

Patented Mar. 13, 1928.

1,662,551

UNITED STATES PATENT OFFICE.

JOHN R. WELCH, DECEASED, LATE OF MUNCIE, INDIANA, BY VIOLA M. WELCH, EXECUTRIX, OF MUNCIE, INDIANA, ASSIGNOR TO VIOLA M. WELCH INDIVIDUALLY.

METALLIC VEHICLE WHEEL.

Application filed December 14, 1923. Serial No. 680,640.

This invention relates to the type of wheel that has a demountable rim whereby to quickly apply a tire to a wheel or to remove the tire, the invention having reference more particularly to that portion of a metallic wheel that is designed for securing a demountable rim to the wheel.

An object of the invention is to provide an improved wheel rim or felly that shall be strong and substantial and not objectionably heavy.

Another object is to provide an improved wheel rim or felly which shall have improved means for securing a demountable rim thereto and permit the rim to be quickly and firmly secured in place by simple means.

A further object is to provide an improved reinforced sheet metal wheel rim or felly that shall be of such construction as to stiffen the side plates of the rim or felly, in such a manner that the stiffening means may advantageously serve to center a demountable rim on the rim of felly, even though the demountable rim be slightly distorted and not truly circular.

A still further object is to provide an improved metallic wheel rim or felly and devices for securing a demountable rim thereto, that shall be of such construction as to not be liable to cause a demountable rim to stick fast to the wheel rim when removal of the demountable rim is desired, which rim or felly and attachments shall be of simple and inexpensive construction and such as to be durable and economical in use.

With the above-mentioned and other objects in view, the invention consists in a vehicle wheel having a novel rim or felly and means for detachably securing a demountable rim thereto; and, the invention consists also further in the parts and combinations and arrangements of parts as hereinafter particularly described and further defined in the accompanying claims.

Referring to the drawings,—Figure 1 is a front or outer side view of a vehicle wheel, partially broken away, having the improvements therein; Fig. 2 is a fragmentary sectional elevation approximately on the line II—II in Fig. 3 which is a fragmentary transverse section approximately on the line III—III in Fig. 1 on an enlarged scale; Fig. 4 is a fragmentary transverse section showing parts of the preceding figure; and, Fig. 5 is a view similar to Fig. 4 but indicating that parts of the structure are integrally connected together or intimately welded one to another.

Similar reference characters in the various figures of the drawings indicate corresponding elements or features of construction herein referred to in detail.

As illustrative of the general nature of the invention an automobile wheel of the spoke type is illustrated, and it comprises a hub 1 and a suitable number of spokes 2 connected to the hub and having each a tapered tenon 3 on its end, such being as hitherto constructed or may be of any desired construction as to details.

The improved felly or rim proper of the wheel comprises a circular body or band portion 4 provided with conical frustums 5 pressed up on the outer portion thereof to constitute sockets to receive the spoke tenons when the band is in place on the spokes. The body or band portions has outwardly extending flanges on opposite edge portions thereof which constitute side members or plates 6 and 7 respectively, which are turned over each toward the other to constitute stiff circumferential tread ribs 8 and 9 respectively, which, in some cases, are further turned or rolled so as to extend inward towards the portion 4 and also further extend outwardly nearly to the side members, and in some cases the terminal or edge portions thereof have notches 10 and 11 respectively to receive portions of securing bolts, the notches preferably being arranged circumferentially in proximity to the spoke sockets. The circumferential portions of the tread ribs have recesses therein designed so that the side members 6 and 7 shall have seats 12 and 13 therein and the turned-over inner portions of the ribs shall have similar seats 12' and 13' respectively. The side members 6 and 7 have bolt holes 14 and 15 respectively. The felly portion of the wheel is provided with a suitable number of bridge bars 16, each bar being arranged on the seats formed in the recesses in the tread ribs, and practically tie the side members of the felly together and stiffen them where they are slightly weakened because of the bolt holes and the recesses cut therein. The outer portion of each bridge bar has a tapered face 17 on which to slide a demountable rim, the thicker end of the bridge bar has a curved head member 18 thereon against which to stop the demountable rim, the inner side of the bridge bar has a lug member 19 integral therewith and with a portion of the head member, and the lug member is fitted closely to the outer side of the side plate 6, the side member 6 representing the inner side of the wheel as used on a vehicle. The lug member has a bolt hole 20 therein that is in alinement with the hole 14 and preferably has screw threads 21 therein. The lug member 19 essentially is rigidly fixed on the side member or plate 6, to firmly secure the bridge bar in place and to prevent the demountable rim from forcing the head member 18 from its proper guide position relatively to the felly. Preferably the lug member 19 is secured to the side member 6 of the felly by means of rivets 22 and 22' on opposite sides of the bolt hole, and preferably the lug member is further secured in place by being electrically welded to the side member. Securing bolts 23 are provided which are arranged in the holes 14 and 15, each bolt extending through the hole 20 and having screw threads 24 in engagement with the screw threads 21, so that the bolt is firmly secured to the felly and may have a nut or head 25 thereon whereby to lock the bolt in place. The bolt extends a suitable distance beyond the front side plate 7 of the felly and is provided with a nut 26, whereby to secure a suitable wedge to the felly.

The bridge bars 16 have each a guide channel 27 therein extending from the end thereof that is connected to the outer side member 7 of the felly, in which a key 28 is seated and guided, the key having a tapered portion 29 on which is a head member 30, and also a lug member 31 arranged on the bolt 23 and having a projecting bearing member 32 that engages the outer side member 7 adjacent to the body portion 4 of the felly, for forcing a demountable rim to the heads 18, by means of the nuts 26 on the bolts. The demountable rim may comprise an annular body portion 33 having clincher flanges 34 and 35 thereon for holding a pneumatic or other tire 36 on the wheel.

As indicated in Fig. 5 the bridge bars are made practically integral with the side members or plates of the felly, by electric welding or otherwise, the lugs 19 being likewise permanently fixed to the inner side member or plate 6 of the felly so as to effectually prevent dislodgment of the head member 18.

In practical use, a tire being secured to a wheel by means of a demountable rim, as described, the demountable rim is truly centered and guided on the felly by means of the heads 18 and 30 which embrace the opposite sides of the demountable rim, whether the latter has relatively fixed or other clincher flanges or rings. The tapered faces of the bridge bars and the keys insure tight fitting of the demountable rim on the felly and do not present long or continuous contact surfaces that tend to cause the rim to stick to the felly. When change of tires is required or desired, the nuts 26 may be readily removed from the securing bolts to permit removal of the keys 28 and their lug members 31, to release the demountable rim which may be readily removed from place on the bridge bars to be replaced by another, or to be again applied to the wheel as before.

What is claimed as new is:—

1. A vehicle wheel felly having two side members provided with tread ribs respectively, each rib having a plurality of recesses therein, a plurality of bridge bars secured in the recesses respectively of the two tread ribs, each bar having a guide channel therein and also a head, and a plurality of keys removably arranged in the channels and having heads thereon respectively, the keys being adjustable in the channels and having securing means.

2. A vehicle wheel having a metallic felly portion comprising two opposite side members, a plurality of bridge bars having each a lug member permanently fixed to one of the side members of the felly portion and having also a head member thereon, each bridge bar being permanently seated on both of the side members of the felly portion, and a plurality of keys removably secured to the bridge bars respectively, each key having a head thereon.

3. In a vehicle wheel, the combination of a circular felly body portion and two opposite outwardly-extending side member flanges thereon, each flange having a turned-over tread rib thereon, each flange having bolt-holes therein, a plurality of bridge bars having each a lug member and a stop head on one end thereof, the bars having permanent connections with the two tread ribs and the lug members having permanent fixed connections with the outer face of the rear one of said flanges, the lug members having screw-threaded bolt holes continuous with the bolt holes respectively in the flange, a plurality of securing bolts arranged each in and extending through a bolt hole in each of the flanges, each bolt extending through the screw-threaded hole in the lug member and having screw threads engaging the threads in the hole, a nut on the bolt seated against the lug member, and means to co-operate with the bolts to secure lug members to the front one of said flanges with keys to cooperate with the bridge bars respectively.

In testimony whereof, I affix my signature on the 15th day of November, 1923.

VIOLA M. WELCH,
*Executrix of the last will of John R. Welch, deceased.*